April 25, 1967  J. A. M. LEDUC  3,316,126
FUEL CELL
Filed March 1, 1962  4 Sheets-Sheet 1

INVENTOR.
JOSEPH ADRIEN M. LEDUC
BY G. H. Palmer
John C. Quinlan
ATTORNEYS
Maurlin Klosty
AGENT April 25, 1967 J. A. M. LEDUC 3,316,126
FUEL CELL
Filed March 1, 1962 4 Sheets-Sheet 2

INVENTOR.
JOSEPH ADRIEN M. LEDUC
BY G. H. Palmer
John C. Quinlan
ATTORNEYS
Marylin Klosty
AGENT April 25, 1967 J. A. M. LEDUC 3,316,126
FUEL CELL
Filed March 1, 1962 4 Sheets-Sheet 3

INVENTOR.
JOSEPH ADRIEN M. LEDUC
BY G. H. Palmer
John C. Quinlan
ATTORNEYS
Marylin Klosty
AGENT

United States Patent Office 3,316,126
Patented Apr. 25, 1967

3,316,126
FUEL CELL
Joseph Adrien M. Leduc, Short Hills, N.J., assignor to Pullman Incorporated, a corporation of Delaware
Filed Mar. 1, 1962, Ser. No. 176,533
4 Claims. (Cl. 136—86)

This invention relates to a new and improved process for converting the energy liberated by a chemical reaction directly into electrical energy. In a more particular aspect the present invention relates to an improved fuel cell capable of generating current of a relatively higher voltage.

It is known that considerable time and money are being expended in order to develop electrochemical devices commonly referred to as fuel cells which are capable of transforming the energy released by chemical reaction directly into electrical energy. For each system, the theoretical or standard cell potential can be calculated using thermodynamic principles from the following equation:

$$E^\circ = \frac{4183 \Delta F^\circ}{-n \mathcal{F}}$$

wherein $E^\circ$ = standard cell potential volts (with reactants and products in a state of unit activity)
$\Delta F^\circ$ = standard free energy change for the cell reaction in question, kilocalories
$n$ = number of electrons transferred in the cell reaction (equivalents)
$\mathcal{F}$ = the faraday, 96,500 coulombs per equivalent.

It is seen, therefore, that the theoretical cell potential of E.M.F. (electromotive force) of any particular fuel cell is related to the free energy change associated with the chemical reaction taking place therein.

One type of fuel cell which has received considerable attention is the high pressure hydrogen-oxygen fuel cell; in this cell, hydrogen is used as fuel coupled with oxygen as the oxidant and is usually operated at a higher temperature of about 250°–400° F., a pressure of from 300–600 pounds per square inch absolute using about 20–40 percent aqueous potassium hydroxide as electrolyte. The calculated open circuit potential (O.C.P.) of this cell is 1.17 volts. The low temperature hydrogen-oxygen fuel cell which is usually operated at a temperature of 140–160° F. and at about ambient pressure to 150 pounds per square inch has a slightly higher calculated E.M.F. of 1.23 volts.

Another type of power cell is the so-called consumable electrode fuel cell. An example of this type is the sodium amalgam-oxygen fuel cell, the calculated open circuit potential which is 2.2 volts when operated at 150° F. and ambient pressure using aqueous sodium hydroxide electrolyte and amalgam containing about 0.5 percent by weight of sodium. Although the E.M.F. based on the use of pure sodium is higher, advantage of the difference in free energy cannot be taken thereof in view of the high reactivity of pure sodium with the aqueous electrolyte. Another disadvantage, of course, is the fact that there are hazards involved in handling pure sodium as well as sodium in a dissolved state.

The voltage of an operating fuel cell is always less than the calculated cell potential, the decrease being due to certain unavoidable losses such as energy associated with the preparation of the fuel to a form suitable for use in the cell, polarization (activation, concentration, etc.), voltage drop caused by ohmic resistance as the current flows through electrodes, electrolyte and current conductors. It can be seen, therefore, that on an average basis fuel cells developed to date are capable of producing current of only lower voltage of the order of about 0.9–2.0 volts (O.C.P.) even at elevated temperatures, leaving much to be desired in the way of increasing power output. It is also manifested that any fuel cell which allows operation for even a few tenths of a volt higher represents, on a percentage basis, a large increase in power and a valuable contribution to the efficiency of fuel cells.

It is an object of this invention to provide an improved process for the generation of current electrochemically.

Another object is to provide a power cell from which high current densities can be drawn with minimized loss in power performance.

Another object is to provide a fuel cell having a good power output when operated at ambient temperatures and pressures.

Another object is to provide a fuell cell in which a metal is employed as fuel and in which the electrolyte bath is aqueous.

A further object is to provide a fuel cell which is readily adapted to continuous operation for a prolonged period of time without the necessity of continuously charging fuel from an external source.

A further object is to provide a fuel cell having the above characteristics and in which the fuel is one that is readily stored and handled.

A still further object is to improve the electrochemical conversion efficiency of a fuel cell in which the alkaline earth metal is employed as fuel.

A still further object is to provide an improved fuel cell and design therefor of the consumable electrode type.

Various other objects and advantages of this invention will become apparent to those skilled in the art from the accompanying description and disclosure.

Accordingly the above objects are accomplished by the process which comprises reacting a fuel comprising an alkaline earth metal in combination with another metal-containing component, and an oxidant electrochemically in an aqueous medium in a cell provided with means for bringing the fuel and oxidant into the proximity of suitable electrodes at which the electrochemical reactions take place and from which the current produced by the cell is withdrawn therefrom. Of the alkaline earth metals employed, i.e., strontium, barium and calcium, barium metal is preferred and thus for illustrative purposes and convenience the following discussion is drawn primarily to the use of barium. The oxidant includes oxygen and the halogens (chlorine, fluorine, bromine and iodine), of which oxygen and chlorine are preferred.

As compared with fuel cells in which sodium amalgam is employed coupled with oxygen, the power performance of the fuel cells of this invention is significantly higher. Another advantage of the power cells of this invention is that the alloys of barium are less reactive chemically than sodium amalgam and thus are more adapted to useful application.

In accordance with the teachings of this invention, the alkaline earth metal is used in combination with another component comprising a metal including elemental metals, intermetallic compounds, as well as hydrides, carbides, nitrides and metal salts. In accordance with one embodiment of this invention, the alkaline earth metal is used in the form of an alloy with one or more of the following metals: metals of Group I–B such as copper, silver and gold; metals of Group II–A such as magnesium; metals of Group II–B such as cadmium, zinc, and mercury; metals of Group III–A such as aluminum; metals of Group IV–A such as lead and tin; metals of Groups V–A such as bismuth and antimony; metals of Groups VI–B such as chromium, molybdenum and tungsten; the iron group metals of Group VIII, i.e., iron, cobalt and nickel; and the rare earth metals such as lanthanum. In addition to alloys of the alkaline earth metal with another elemental metal, the term "alloy" as used herein is also intended to include admixtures of the alkaline earth metal with nitrides, carbides and hydrides of one of the above-enumerated metals, and admixtures of the alkaline earth metal with intermetallic compounds such as selenides, silicides and tellurides.

The alkaline earth metal content of such alloys varies over a relatively wide range such as from 0.1 to 99 percent by weight based on the total weight of the alloy. In the case of the solid alloys, that is, other than liquid amalgams with mercury (i.e., amalgams containing a relatively low content of the alkaline earth metal of between about 0.1 and about 2 percent by weight), the alkaline earth metal is usually present as the major constituent. Thus in the case of the solid alloys, the alkaline earth metal content is usually at least 50 percent by weight based on the total weight of the alloy and is preferably between about 80 and about 98 percent by weight.

The solid alloys are prepared by various techniques. One method comprises melting of the alkaline earth metal and the alloying metal, admixing the melt and solidifying the mixture to form solid solutions of the alkaline earth metal and alloying component. For example, between about 85 and about 95 parts by weight of barium and correspondingly between about 15 and about 5 parts by weight of lead are melted and mixed to cast the alloy. In this manner, an alloy containing barium and lead in a weight ratio of 9:1, for example, is prepared and is particularly useful in the fuel cells described herein.

Another method of preparing the alloy comprises physically admixing solid particles of the alkaline earth metal and particles of the alloying metal under an inert atmosphere such as helium or argon. After thorough mixing, the admixture is compressed with or without the application of heat to pressures of the order of between about 2 and about 25 tons per square inch. Usually, the particle size of the alloying metal is less than that of the alkaline earth metal such that the finer particles also coat the particles of the alkaline earth metal. For example, a barium-zinc alloy in which the barium is also coated with particles of zinc is prepared by physically admixing thoroughly particles of barium (100 mesh) with very fine zinc powder (about −325 mesh) under a helium or argon atmosphere in a weight ratio of barium to zinc of about 9:1 at a temperature of about 50° to 100° C. (e.g., 75° C.) followed by compression of the admixture under a pressure of about 20 tons per square inch.

In accordance with another method of preparing the alloy, the alloying metal or metal salt is melted and vaporized followed by deposition of the vapors of metal onto the surface of the alkaline earth metal under an inert atmosphere. When the alloying component is initially used in the form of elemental metal, it is vaporized usually at its boiling point in an inert atmosphere such as helium or argon. When a salt of the alloying metal is employed, it is vaporized in a reducing atmosphere such as hydrogen thereby forming elemental metal. For example, in accordance with this technique of preparing the alloys employed in the fuel cells of this invention, tin is vaporized at a temperature between about 1200° and 1300° C. under a vacuum of about 10–20 mm. mercury pressure and in an inert residual atmosphere such as helium or argon. When a halide of tin such as stannous chloride is used, it is vaporized at a temperature of about 600° C. in a hydrogen atmosphere thereby forming elemental tin. In each case, the vapors of tin are brought into contact with barium particles (50–100 mesh) at the indicated temperature until the total concentration of tin deposited on the surface of the barium is between about 1 and about 8 percent by weight (e.g., about 2 percent) based on the total weight of the alloy. The coated particles are then cooled in an inert gas such as argon and molded by compression.

During operation of the fuel cells in which the alkaline earth metal is in the form of an alloy, the alloying metal may or may not enter into the electrochemical reaction and may or may not be anodized (or oxidized). For example, in the case of the amalgams, the mercury undergoes essentially no electrochemical change, being substantially inert and is recovered as mercury or depleted amalgam as the alkaline earth metal fuel is oxidized at the anode. In other cases anodization of the alloying component such as zinc, tin, lead, cadmium, aluminum and magnesium occurs. For example, when the fuel cell is operated using barium alloyed with zinc, oxygen as the oxidant and an aqueous alkaline electrolyte bath, zinc oxide is formed by anodization and passes into the electrolyte as zincate ion. Similarly, when the alloying component is tin, an oxide of tin is formed at the anode and passes into the electrolyte system as stannate ions. For the purpose of aiding oxidation of the alloying component, various oxidizing agents are added to the aqueous electrolyte bath such as the alkali metal salts of peroxyacids such as the alkali metal persulfates, pertungstates, percarbonates, perchromates and perchlorates. Additionally, a compound may be added to the aqueous electrolyte system in order to form a complex with the alloying component or with the oxide thereof produced by anodization, and thereby effectuate removal of the alloying component as the alkaline earth metal is oxidized electrochemically. For example, when copper or magnesium is the alloying component, a suitable complexing agent is sodium ethylene diamine tetra-acetic acid; when iron is the alloying component, other suitable complexing agents are the alkali metal salts of gluconic acid such as sodium gluconate, citrate, oxalate and heptanoate; and when nickel or cobalt are the alloying components, suitable complexing agents are the alkali metal cyanides such as sodium cyanide. Such complexing agents are usually added to the aqueous electrolyte system in an amount which is at least sufficient to complex the alloying component or a compound thereof.

As noted above, the alkaline earth metal may also be employed in combination with a salt of one of the above-enumerated metals, as well as with salts of the alkali metals and alkaline earth metals. For example, typical examples of such compounds are the sulfates, carbonates, halides, fluorides and oxides of barium, lead, tin, zinc, aluminum, lithium, sodium, potassium, strontium and calcium. The alkaline earth metal fuel such as barium is used advantageously when physically admixed or coated with such compounds which pass into the aqueous electrolyte system as the fuel is oxidized at the anode.

Also included within the scope of the present invention is the use of the alkaline earth metal in the form of a liquid amalgam which usually contains between about 0.1 and about 2 percent by weight of barium. Such amalgams are prepared by a variety of methods. One method comprises simple dissolution of the alkaline earth metal in mercury within the aforesaid amounts. This is accomplished either directly or by contacting barium chloride with sodium amalgam at about 90°–100° C., or during the electrolysis of aqueous barium chloride in an electrolysis cell in which a mercury cathode is employed.

In accordance with the process of this invention, the electrochemical reactions are effected by bringing the alloyed fuel and the oxidant into contact with suitable electrodes in an aqueous electrolyte. Although the electrolyte may initially be water without an added ionizable compound, for more efficient operation and improved conductivity, at least one water soluble ionizable compound is preferably added as a component of the electrolyte system. When the oxidant is oxygen, the aqueous electrolyte is usually alkaline and for this purpose there is used any water soluble compound which when in solution renders the medium alkaline and which does not impair the chemical reactions taking place at the electrodes. For example, metal hydroxides such as the alkali metal and alkaline earth metal hydroxides as well as soluble metal oxides, and any combinations thereof are suitable. Typical examples of such alkaline producing compounds are sodium hydroxide, potassium hydroxide, lithium hydroxide, barium hydroxide, calcium hydroxide, strontium hydroxide, and soluble oxides such as barium oxide, calcium oxide and strontium oxide.

The initial concentration of the added alkaline compound may vary over a relatively wide range such as from very dilute solutions to saturated solutions, the concentration depending upon the solubility of the particular compound employed. For example, in the case of the alkali metal hydroxides the concentration thereof may vary between about 0.05 and about 20 molar and is preferably between about 0.1 and about 5 molar. In the case of the less soluble alkaline metal hydroxides such as those of the alkaline earth metals, the concentration employed is usually saturated (from about 0.2 to about 6.0 molar) at the operating temperature of the cell. In this respect it is noted that when barium, for example, is employed as the fuel, barium hydroxide forms and due to its relatively low solubility it usually precipitates from the aqueous medium without an adverse effect on the performance of the cell. The barium hydroxide is readily recovered as a valuable product of the process of this invention by simple liquid-solid separation techniques.

When the halogens are used as the cathodic reactant or oxidant, an electrolyte is usually added to the aqueous medium which yields ions of the same type which are being formed at the cathode. For this purpose, the alkali metal and alkaline earth metal halides are suitable. For example, when chlorine is used as the oxidant, typical examples of suitable added electrolytes are sodium chloride, potassium chloride, barium chloride, strontium chloride and any combination thereof. When the oxidant is a halogen, the aqueous medium may be acidic or alkaline. Inasmuch as the chemical reactivity of barium is less in an alkaline medium than in acidic solutions, the cell is usually operated using an aqueous medium which contains, in addition to the metal chloride, an added hydroxyl-yielding compound such as one of the above-mentioned metal hydroxides or oxides.

It has been found that when the oxidant is oxygen, the power output of the cell is increased when one of the aforesaid metal hydroxides is used in combination with a metal salt including inorganic and organic salts such as the halides, oxygen-halides, thiocyanates and acetates of the alkali metals, the alkaline earth metals and of metals of Groups II-B, III-A, V and VIII. Typical examples of such suitable metal salts are barium chloride, barium thiocyanate, barium chlorate, barium acetate, strontium chloride and calcium chloride and aluminum chloride. Of these, the alkaline earth metal halides, particularly the chlorides, are preferred. The metal salt, when used, is added in an amount sufficient to yield a concentration of metal ion of between about 0.05 and about 5 molar in combination with a metal hydroxide within the aforesaid concentration, i.e., hydroxyl concentrations between about 0.01 and about 20 molar. Within these ranges the power performance of the cell is greatest when the hydroxyl ion concentration of the aqueous medium is between about 0.8 and about 0.2 molar and the concentration of metal ion is correspondingly between about 0.2 and about 1.0 molar. Within these preferred concentrations, the ionic strength of the aqueous medium is about 1 and about 3.

It is to be understood that in addition to adding a metal hydroxide to the aqueous electrolyte bath, it may be formed in situ during operation of the cell. For example, when the combination of added electrolytes is an added alkali metal hydroxide and barium chloride, barium hydroxide is formed as the barium is oxidized at the anode. Such a three-component electrolyte system is very effective even when the aqueous medium contains a very substantial amount of precipitated barium hydroxide.

The temperature at which the electrolyte is maintained and at which the fuel cell is operated varies between about 20° C. and about 250° C. The cell also may be operated over a wide range of pressure and generally the pressure is between atmospheric and about 700 pounds per square inch. Any combination of pressure and temperature may be employed with the preferred limitation that they be so regulated to maintain the electrolyte in the liquid phase. Although good performance is realized at room temperature and atmospheric pressure, the electrode surface tends to increase in temperature when the cell is operated at high current densities of the order of about 200 to 300 amperes per square foot of apparent electrode surface and higher. Thus from the standpoint of continuous generation of current of such high current densities, it is usually preferred to pressurize the cell even when operating at room temperature.

It is to be understood that the term "apparent electrode surface" as used herein with respect to expressing current density, is defined as the geometric dimensions of the electrode without consideration of the surface area contributed by the porous surface of the particular electrode.

When it is desired to produce current of higher amperage and low voltage, individual fuel cells are connected in parallel and in producing current of low amperage and high voltage, individual fuel cells are connected in series as known to those skilled in the art.

For a better understanding of the present invention, reference is made to FIGURES 1 to 9 of the accompanying drawings.

Figure 1:
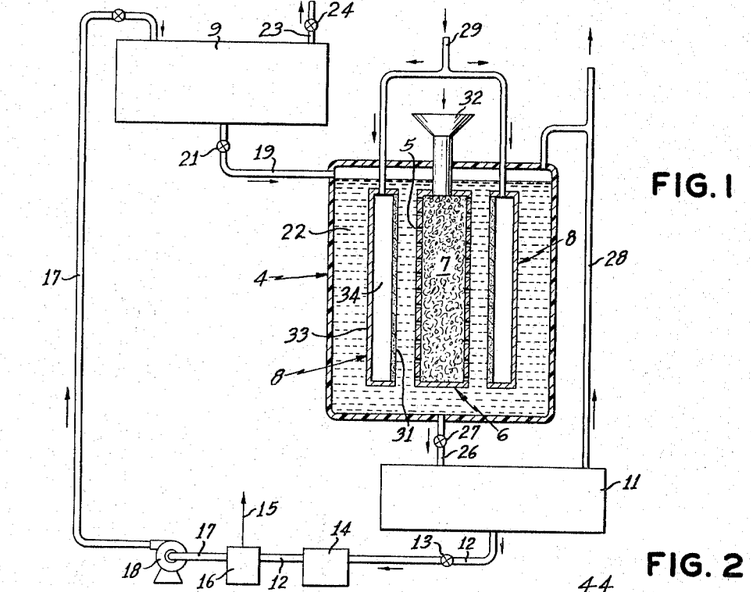
FIGURES 1-4 of the accompanying drawings are longitudinal views in elevation of suitable apparatus in which the electrochemical reactions of this invention are effected and in which the fuel is in the form of a solid alloy.

The fuel cell illustrated by accompanying FIGURE 1 comprises the cell container 4 having disposed therein electrodes typically illustrated by electrode assembly 6 and 8 and is provided with electrolyte feed source 9 and electrolyte reservoir 11, reservoir 11 being connected to the electrolyte feed source 9 by means of lines 12 and 17 having cooler 14, filtration zone 16 and pump 18 thereon.

The inner walls of the cell body 4 are composed of any suitable material or coated material which is chemically inert to the electrolyte and chemicals produced by the cell and, in addition, is an electrically non-conductive material such as vinyl or other plastic or resin, rubber, refractories, or coated metals. The cell body may have a cross-section of any desired shape such as circular, rectangular or square.

Electrode assembly 6 constitutes the anode and that portion which is submerged in electrolyte 22 is composed of an electroconductive metal such as steel, stainless steel, etc. At least that portion of anode 6 which faces gas diffusion electrode 8 (cathode) is in the form of a screen or other perforated or porous structure 5 having apertures sufficiently small to retain particles of solid alloy or particles of barium fuel coated with a metal salt within the anode support. Particles 7 are of any suitable or convenient shape and dimension such as chunks, wires, chopped wires, broken pieces or slices of alloyed fuel. The alloy or coated particles also may be used in the form of fluidized particles. Anode 6 is provided with a means for introducing particles of alloy to the interior of the electrode. Although the fuel inlet 32 is shown in FIGURE 1 as a funnel-shaped inlet port, it is to be understood that any automatic feeding devices are suitable. The inlet port may be connected to means (not shown)

in which the alloy is machined to the desired particle size and shape.

The gas electrode employed in the fuel cells of this invention comprises an electrically conductive material through which the gaseous oxidant diffuses towards the surface in contact with the electrolyte. The electroconductive metal is any one of the elements of Groups I–B, II–B, III–VIII, inclusive, of the Periodic Chart of the elements, as well as the rare earth metals and any combination thereof. The conductor may be in the form of sintered powder or specially prepared porous metal, or carbon. Also included within the scope of this invention is a gas diffusion electrode comprising the electrically conductive metal including salts, oxides, etc., thereof homogeneously distributed at least within the pores of an inert substrate such as polyethylene prepared in accordance with the methods disclosed in my prior and co-pending application Serial Number 162,221, filed December 26, 1961, now U.S. Patent No. 3,235,473. The cathode also may be composed of carbon or graphite and may contain catalysts such as silver-silver salt additives.

In view of the fact that the oxidant which is brought into contact with the electrolyte and which undergoes chemical reaction is in the gaseous state, it is preferred that the cathode be in the form of a hollow member provided with an inlet for introducing the gaseous reactant therein. One such form is illustrated by gas electrodes 8 of the accompanying FIGURE 1 which comprises the electrically conductive porous surface 31 and support 33 which together enclose space 34 into which the gaseous oxidant is introduced under a slight pressure by means of inlet 29 which feeds each of gas electrodes 8.

It is to be understood that, unless indicated otherwise, the term "oxidant" as used herein to describe the reactant which is brought into the proximity of the cathode, is intended to include any agent capable of accepting electrons, and includes oxygen and the halogens. The term "oxygen" as used herein includes pure molecular oxygen as well as oxygen-containing gases such as air and mixtures of oxygen with nitrogen or other inert gases in all mol ratios.

As an illustrative example of the operation of the cell of the accompanying FIGURE 1, fuel electrodes 6 are charged with particles of an alloy of barium comprising 93 percent barium and 7 percent zinc as the alloying component. Aqueous electrolyte 22, comprising 0.2 molar barium hydroxide, is fed to the cell from reservoir 9 by means of line 19 having valve 21 thereon in an amount sufficient to fully immerse the cathodes 8 and anode 6. Gaseous oxygen is charged to gas diffusion cathodes 8 in which electroconductive surface 31 is porous silver, under a slight pressure to cause the gas to pass through the pores thereof. The cell is operated at ambient temperature (about 25° C.) and atmospheric pressure. As the electrochemical reactions proceed, the barium of the alloy is converted to barium ions which pass into the aqueous medium forming barium hydroxide; the alloying component, zinc, is anodized forming barium zincate by reaction of the zinc oxide and alkaline medium. Under these conditions the open circuit potential is about 2.4–2.5 volts; at 100 and 300 amperes per square foot of apparent electrode surface the potential of the cell is between about 1.4 and about 1.1, respectively, and the electrochemical conversion efficiency of the cell is about 95 percent, which value is about 50 percent higher than the efficiency of the fuel cell in which substantially pure barium metal is employed, i.e., barium to which no alloying component has been added.

As used herein, the term "electrochemical conversion efficiency" is defined as the number of equivalents of current produced divided by the number of chemical equivalents of fuel consumed.

As the precipitation becomes heavy, the aqueous medium is withdrawn from the lower portion of the cell by means of line 26 having valve 27 thereon, and is passed into electrolyte reservoir 11. The electrolyte is then passed into cooler 14 by means of line 12 having valve 13 thereon wherein the electrolyte is cooled to precipitate additional salts. The solution and precipitate are then passed to filtration zone 16 wherein solids comprising barium hydroxide are separated from the solution, and withdrawn therefrom by means of line 15. When it is desired to recover substantially pure barium hydroxide, the solid is passed to a further recovery and purification zone in which contaminating compounds such as in this example, barium zincate, are removed. Filtrate is pumped from filtration zone 16 through line 17 and is returned to electrolyte feed reservoir 9. The cell is also provided with vents 23 and 28 to prevent build-up of water vapor pressure within the respective electrolyte reservoirs and by means of which unreacted gases are vented. When the fuel cell is not in operation, electrolyte is removed therefrom and is conveniently stored in reservoir 11 so that the barium alloy is not in contact with the aqueous medium for a prolonged period of time.

Figure 2:
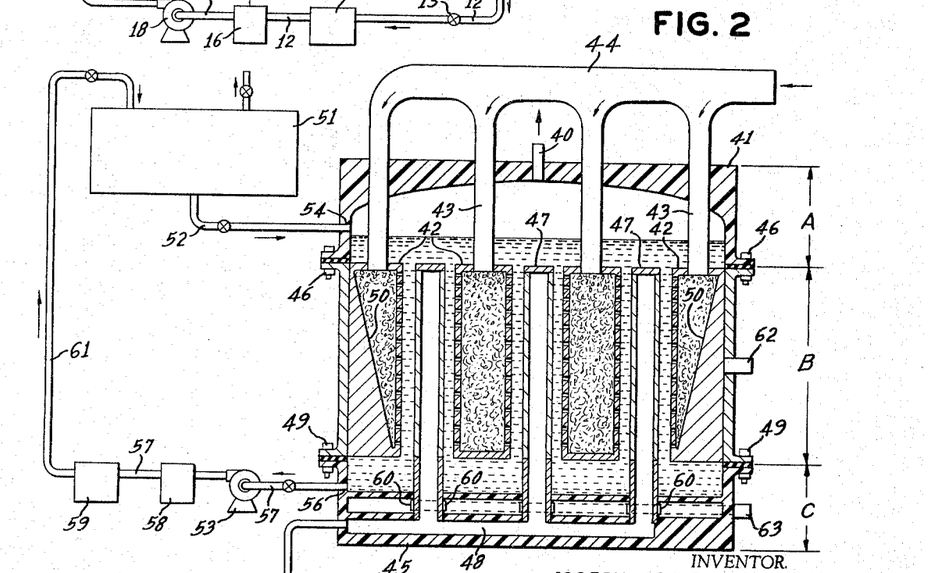

It is to be understood that although the fuel cell of FIGURE 1 is shown with the single anode positioned between two gas diffusion electrodes, the cell may contain any number of alternating anodes and cathodes in which case the type of gas diffusion cathode shown in the drawing is positioned at either end of the cell and the other gas electrodes have a completely reactive and conductive porous surface positioned between each of the anodes as shown in the drawing of the accompanying FIGURE 2.

In accordance with the accompanying FIGURE 2 a three-section fuel cell is typically illustrated comprising: (A) an upper section or dome 41 having vent 40 which is connected to the middle section of the cell by any suitable means such as bolts 46; (B) the middle or anode section comprising fuel electrodes 42 connected to alloy feed inlet 43 which in turn is connected to manifold 44; and (C) the bottom section comprising the base of the cell 45 connected to the middle section by bolts 49, and to which the gas diffusion electrodes 47 and current distribution grids 60 (wires or bars) are fastened and attached to cathode terminus 63. The upper section (A) and lower section (C) of the cell are composed of, or coated with, an electrically non-conductive material and may be, for example, cement or coated metals, whereas the middle section (B) is made of an electrically conductive material such as steel or other metal.

Fuel electrodes 42 are of the type described above in connection with FIGURE 1 and comprise particles of alloyed fuel contained within the perforated support. In order to facilitate the flow of particles into the end electrodes and to avoid the accumulation of particles therein which do not become subjected to the electrochemical reaction taking place at the surface thereof, they are shaped as shown, the terminal portions 50 having a substantially triangular cross section and being composed of a solid conductive material connected to the walls of the metallic middle section (B) having anode terminus 62 thereon.

As shown in FIGURE 2 of the drawing, fuel electrodes 42, except for the outer ones, are positioned between the reactive porous surface of gas electrodes 47 which are fed with oxidant by means of inlet 48 positioned in the base of the cell, the gas flowing in an upwardly direction. In operation, the solid alloyed fuel and oxidant are fed to the anode and the cathode, respectively, and aqueous electrolyte is fed to the cell from electrolyte reservoir 51 by means of line 52 and cell inlet 54. As shown in the drawing the electrolyte is pumped in a downwardly direction passing between the outer surfaces of the anodes and cathodes. It is to be understood, however, that the electrolyte may also be charged to the cell by means of an inlet positioned within the lower section of the cell such that the flow is in an upwardly direction. The lower section (C) of the cell is provided with electrolyte outlet 56 which in turn leads into line 57 having pump 53 thereon, the electrolyte again being passed into cooler 58, filtration zone 59 and through line 61 into electrolyte reservoir 51 as described above.

The type of cell structure shown in FIGURE 2 is readily disassembled, which feature is particularly advantageous when it becomes necessary to clean the cell, replace component parts and electrodes or transport the cell.

The fuel cells of this invention are such that fuel may be stored within the cell in any amount required to operate it for a prolonged period of time without the necessity of carrying fuel by external means or continuously charging fuel to the cell. In accordance with this embodiment of the present invention, the cell is charged with a pre-determined quantity of an alloy of barium in the form of solid plates or blocks, the quantity being calculated according to the power demand. As the electrochemical reactions proceed, barium metal of the alloy is consumed by conversion to barium ions and the thickness of the block of fuel is decreased while the gap of electrolyte between the fuel electrode and the gas diffusion electrode is correspondingly increased. The gap of electrolyte is usually maintained between about .07 and about 0.25 inch. As the barium metal is consumed the blocks of barium are moved by any means such as mechanical or motor-driven means towards the gas diffusion electrodes in order to maintain the distance between them. The displacement of the electrodes can be monitored by a sensing device located between the electrodes, which upon demand (external load, gap), is moved accordingly. A constant displacement is effectuated when the external load is constant. This particular embodiment of the present invention is illustrated by the accompanying FIGURES 3 and 4, which illustrate two means of accomplishing movement of the electrodes, namely, by the sliding assembly of FIGURE 3 and the accordion-like cell shown in FIGURE 4.

Figure 3:
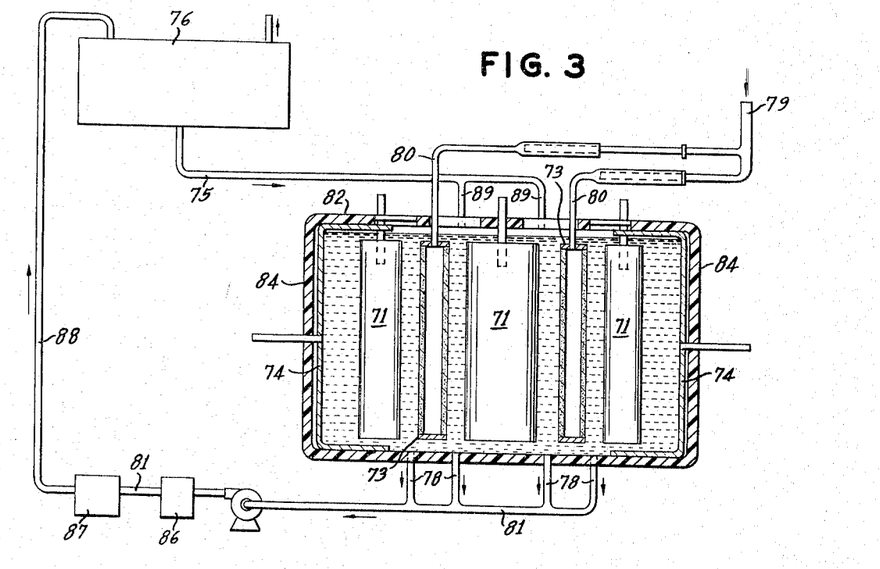

The cell illustrated by FIGURE 3 comprises fuel electrodes 71 in the form of solid blocks of an alloy of barium having positioned therebetween gas diffusion electrodes 73 which are fed with oxidant by means of inlet 79. Electrolyte is fed to the cell by means of inlet manifold 75 which is fed electrolyte from source 76.

The casing of the cell body comprises end walls 82 and 84 which enclose the inner movable walls 74. To accomplish movement of the electrodes as the alloyed fuel is consumed, pressure is exerted on inner section 74 by mechanical or electrically driven means causing section 74 to move inwardly thereby also moving the fuel electrodes along the upper part of the cell casing 82. Additional support is provided for electrodes 71 by connecting them to lower casing 82 in which event the lower casing is also provided with means for movement of the electrodes such as the sliding means shown within the top casing. The connecting lines such as oxidant manifold 79, electrolyte inlet 75, as well as electrolyte outlet 81 are constructed of flexible tubing in the form of a coil or spring, or as shown in the drawing specifically with respect to manifold 79, they may be composed of sections which slide or pass one within the other like the sections of a telescope. Another means for effecting movement of the gas diffusion electrodes, electrolyte inlet and outlet lines, comprises rolling connecting lines 80, 89 and 78, respectively, along their respective distributing manifolds. The circulation of electrolyte and removal of precipitated barium hydroxide which forms when oxygen is the oxidant is accomplished as described above by passing the electrolyte from the cell through outlet 81 into cooler 86 through filtration zone 87, line 88 and into electrolyte reservoir 76.

Figure 4:
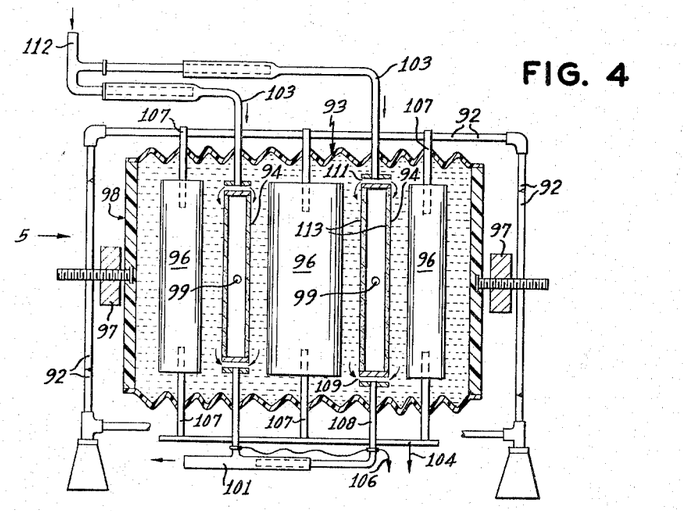

Another illustration of apparatus particularly useful for operation of the cell to which a pre-determined quantity of barium metal is charged is illustrated by the accompanying FIGURE 4. This apparatus comprises support bars 92 having disposed therein bellows 93 to which gas electrode assembly 94 and fuel electrodes 96 are fastened. The bellows themselves are interconnected by end bars 98 having plates 97 fastened thereto. The gas and fuel electrodes are also connected to the upper and lower support beams 92 by means such that the electrodes are readily moved such as by rolling or sliding means along the support. In operation, oxidant is fed to the gas electrodes by means of inlet 99 and aqueous electrolyte is charged to, and discharged from, the cell by means of manifolds 112 and 101, respectively, which are connected directly to the gas electrodes by the individual inlet 103 and outlet 108, respectively.

As the barium metal is consumed, pressure is exerted by various means on plates 97 causing end plates 98 to move inwardly thereby also effectuating contraction of bellows 93 and concomitant movement of the electrodes inwardly. As noted above in connection with FIGURE 3, the displacement of the assembly can be monitored by a sensing device located between the electrodes which, upon demand, is moved accordingly. The fuel and gas electrodes are connected to bus bars 104 and 106, respectively, by means of which current is withdrawn from the cell.

Figure 5:
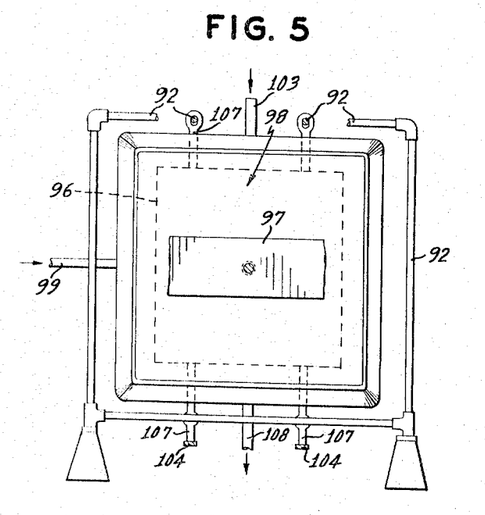
FIGURE 5 represents an end view in elevation of the apparatus of accompanying FIGURE 4.

The accompanying FIGURE 5 is an end view of the cell illustrated in FIGURE 4, the numerals being the same as those employed to designate the corresponding parts shown in side elevation.

As shown in detail in FIGURE 4, gas diffusion electrodes 94 comprise: an inner hollow section to which gaseous oxidant is fed through inlet 99 leading into the middle section of the electrode; the two electroconductive porous surfaces 113; upper section 103 through which electrolyte is fed from distributing manifold 112 and from which electrolyte passes into the cell through apertures 111; and a lower section 108 having apertures 109 through which electrolyte flows and passes out of the cell into electrolyte outlet manifold 101. As shown in FIGURE 4, the upper and lower apertures 111 and 109, respectively, of gas electrodes 94 may either be aligned with the fuel electrodes as shown by electrode 94 positioned to the left of the center fuel electrode, or above and below the fuel electrode as shown by the gas electrode positioned to the right of the center fuel electrode. The latter type of electrode is usually preferred inasmuch as it allows operation of the gas diffusion cathode at a current density approximately equivalent to that of the fuel electrode. This type of gas electrode which has the additional function of serving as the inlet and outlet for electrolyte is particularly suitable for the type of fuel cell illustrated by FIGURES 3 and 4. It is to be understood, however, that such gas diffusion electrodes may also be used in fuel cells in which the alloy is continuously fed to the system.

Figure 6:
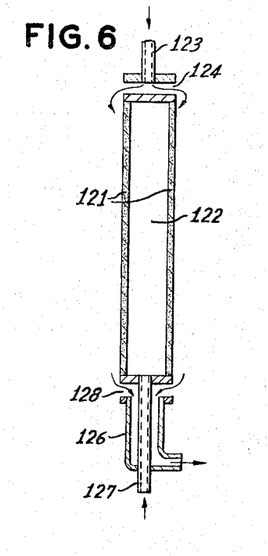
FIGURE 6 is a cross-sectional view in elevation of a suitable cathode assembly.

A modification of the above-described gas electrode 94 is illustrated by FIGURE 6 and essentially comprises electroconductive porous surfaces 121 through which the oxidant diffuses from enclosed inner chamber 122 to which gas is fed by means of inlet 127. The upper portion of the electrode comprises inlet 123 having openings 124 through which the aqueous electrolyte is fed to the cell. The lower portion of the electrode also comprises electrolyte outlet 126 having openings 128 through which electrolyte flows and passes out of the cell. Oxidant inlet 127 and electrolyte outlet 126 may be two separate tubes or, as shown in the drawing, may be positioned in concentric relationship.

Figure 7:
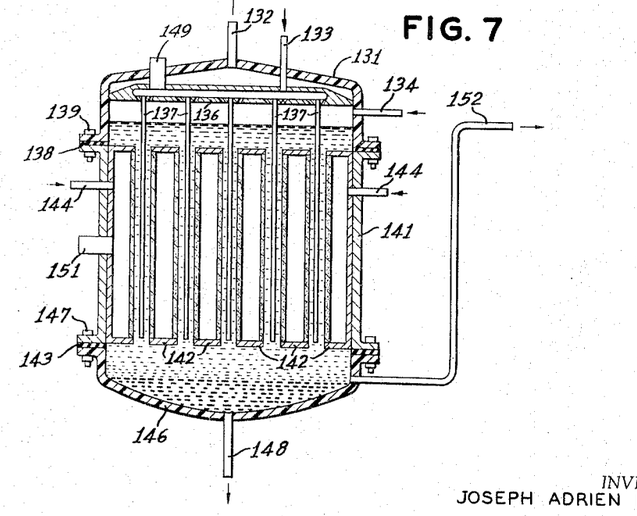
FIGURE 7 represents a longitudinal view in elevation of suitable apparatus in which the alkaline earth metal fuel is used in the form of a liquid amalgam.

The apparatus illustrated in the accompanying FIGURE 7 is a typical fuel cell adapted to the use of liquid barium amalgam. The cell is similar to that of the three-compartment apparatus shown in FIGURE 2 and comprises cell cover 131 fitted with horizontal distributor plate 136 connected to barium amalgam inlet 133 and has suspended therefrom a plurality of steel anodes 137. The cell cover is fitted with outlet 132 for venting. The upper section is fastened to the middle section by bolt means 139, for example, and is insulated therefrom by means of insulator plate 138 which is suitably made of hard rubber, Teflon, polyethylene, Kel-F, etc. Electrolyte is fed to the cell by means of inlet 134 fitted in the top section of the cell.

Gas diffusion electrodes 142 are positioned within the middle section of the cell and are fed with oxidant by means of inlet 144. The middle section (metallic) is fastened to lower portion 146 by bolt means 147 and is separated therefrom by insulator plate 143, the bottom section having a sloping lower surface. In operation, barium amalgam introduced through line 133 passes through the apertures of plate 136 such that the amalgam flows downwardly as a continuous stream along the surfaces of anodes 137, the spent or lean amalgam falling by gravity to the sloping lower surface of the cell. As a pool of spent amalgam accumulates in the bottom of the cell, it is withdrawn therefrom through outlet 148. Electrolyte is withdrawn by means of pipe 152 fitted in the lower portion of the cell and above the spent amalgam which settles to the bottom. In operation, the electrodes are preferably totally immersed in the electrolyte which fills part of the top section of the cell. The electrolyte height is conveniently controlled by outside overflow from pipe 152 which, as shown in the drawing, extends to the height of electrolyte within the cell. The current is withdrawn from the system by electrical connections to anode and cathode terminals 149 and 151, respectively.

It is to be understood that various modifications of the apparatus of FIGURES 1-7 of the accompanying drawings may be made without departing from the scope of this invention. For example, the cells may be provided with any siutable means for circulating the aqueous electrolyte bath such as pump means, stirring means or a draft pipe to minimize localized build-up of electrolyte concentration or temperature.

Figure 9:
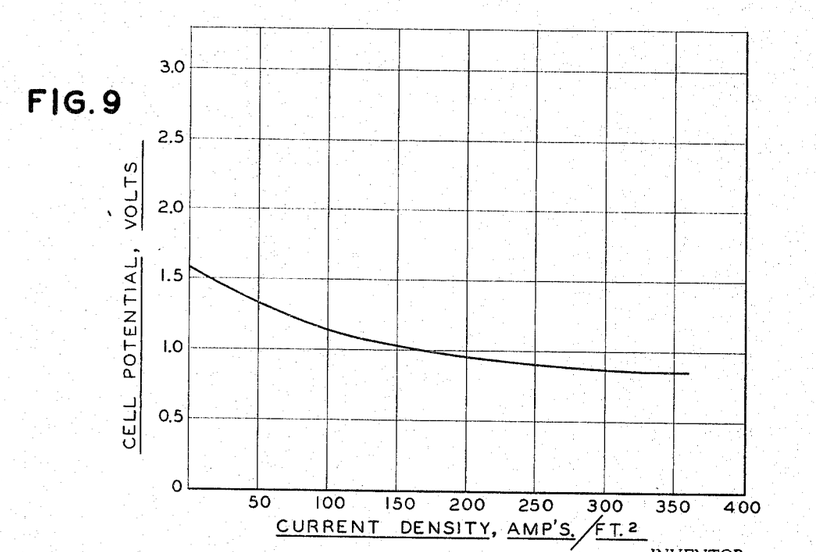
FIGURE 9 illustrates the voltage characteristics of a fuel cell in which an alkali metal amalgam is employed.

It is to be understood that the apparatus of FIGURES 1-5, although described specifically with respect to the use of solid alloys of barium as the fuel, is also advantageously employed in conjunction with other solid fuels coupled with a gaseous oxidant. Similarly, although the apparatus of FIGURE 7 is described specifically with respect to one embodiment of the process of this invention, namely, the use of liquid amalgams of the alkaline earth metals, it is also suitable as apparatus in which any liquid fuel is brought into contact with the anode means such as alcohols, hydrocarbons and other liquid amalgams such as amalgams of the alkali metals, while a gaseous oxidant is used as the cathodic reactant. Exemplary of another such fuel cell system is the sodium amalgam-oxygen fuel cell, the voltage-current density characteristics of which are illustrated by the graph of the accompanying FIGURE 9. The graph is based on the performance of a fuel cell containing a 50 weight percent aqueous solution of sodium hydroxide having disposed therein a porous carbon gas diffusion cathode and an anode having a vertical steel surface of the same size. Sodium amalgam containing 0.23 weight percent sodium is brought into contact with the vertical steel surface of the anode while gaseous oxygen is passed through the porous cathode, the oxygen pressure at the surface of the cathode being atmospheric. The cell is operated with continuous flow of aqueous electrolyte and at a temperature of about 175° F., the performance of the sodium amalgam-oxygen fuel cell being at an optimum at elevated temperatures.

The following specific description is offered as a further understanding of the process of this invention.

A fuel cell consisting of an epoxy coated stainless steel body is charged with an aqueous electrolyte bath and is fitted with electrodes vertically disposed therein. The spacing between the electrodes is 0.125 inch. A porous silver gas diffusion electrode having an area of 1.5 square inches is used as the cathode. The anode is of the same size and has a vertical steel surface. Barium amalgam containing 0.28 weight percent barium is brought into contact with the steel surface of the anode while a gaseous oxidant is passed through the porous cathode. The pressure of the gaseous oxidant at the cathode surface is atmospheric. The fuel cell is operated at ambient temperature (25° C.) and atmospheric pressure.

Figure 8:
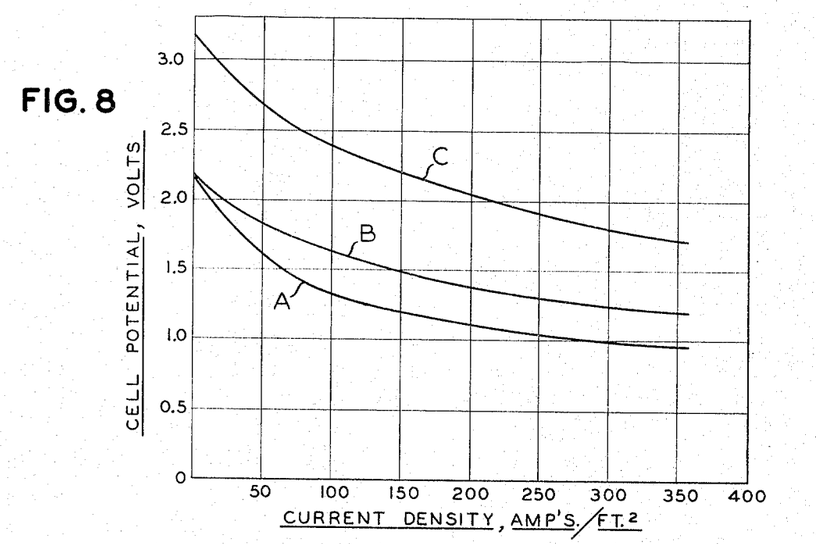
FIGURE 8 illustrates the voltage characteristics of the fuel cells in which an amalgam of an alkaline earth metal is used.

The graphs of accompanying FIGURE 8 show a correlation of current density and cell potential of the fuel cells of this invention, calculated on the basis of the following specific aqueous electrolyte system and oxidant:

(1) Line labeled A of FIGURE 8 illustrates the performance when oxygen is the oxidant and a saturated aqueous solution of barium hydroxide (about 0.22 molar) is the electrolyte.

(2) Line labeled B of FIGURE 8 illustrates the performance when oxygen is the oxidant and an aqueous solution having 0.44 mol per liter of barium chloride and 0.65 mol per liter of sodium hydroxide dissolved therein is the electrolyte.

(3) Line labeled C of FIGURE 8 illustrates the performance when chlorine is the oxidant and the aqueous electrolyte bath contains barium chloride (1.62 molar).

The power output of the cells in which the alkaline earth metal is a major constituent of a solid alloy ranges between that of cells in which the liquid amalgams are used and approaches that of cells in which barium is not alloyed. Thus the power output of the cells of this invention in which the solid alloys are used is at least as high as that of the liquid amalgam systems on which the graphs of accompanying FIGURE 8 are based and approaches those of the power cells in which barium metal is used in substantially pure form, namely, open circuit potentials of from about 2.60 volts (barium-oxygen in saturated barium hydroxide solution operated at room temperature) and about 2.65 volts (barium-oxygen in an aqueous solution comprising sodium hydroxide and barium chloride operated at room temperature) to about 3.5 volts (barium-chlorine in an electrolyte system containing barium chloride). The alloying component also may function as an activator or promoter for the anodic oxidation of barium and thereby enhance the power output.

Although the power output of the barium-oxygen fuel cell is sometimes reduced when the barium is in the form of an alloy, the use of the alloy including the amalgams enhances the electrochemical conversion efficiency. For example, in the case of the fuel cell in which non-alloyed barium is used coupled with oxygen in an aqueous saturated barium hydroxide solution, the electrochemical conversion efficiency is about 60 percent, whereas when barium is used in the form of an alloy, the efficiency is higher and approaches 100 percent.

Various modifications and alterations of the process and apparatus described herein may become apparent to those skilled in the art from the accompanying description and disclosure without departing from the scope of this invention.

Having described my invention, I claim:

1. A fuel cell for the generation of electrical energy in which a solid reactant is used at one of the electrode means and in which a gaseous reactant is contacted with the opposing electrode means which comprises in combination a cell body having a liquid electrolyte bath contained therein, said cell body comprising an upper section and a lower section having a separable middle section therebetween, said middle section comprising an electrically conductive outer casing having positioned therein and in electrical association with said outer casing a plurality of electrode means having an inner chamber adapted to be fed a solid reactant, said lower section of the cell body having positioned therein a plurality of gas diffusion electrodes comprising an outer porous surface and an inner chamber adapted to be fed a gaseous reactant, said gas diffusion electrodes extending upwardly from the said lower section and into the middle section in alternating spaced relationship to the electrodes in association with the middle section, the inner chamber of the electrode means in association with the middle section being enclosed on the side which opposes a gas diffusion electrode by a wall having openings therein by means of which solid reactant contained in the inner chamber is contacted with liquid electrolyte, said cell body being further provided with inlet means for feeding solid reactant to the inner chamber of the electrodes in association with the middle section, and with inlet means for feeding gaseous reactant to the cell such that gaseous reactant may be fed to the inner chamber of the gas diffusion electrodes.

2. The fuel cell of claim 1 in which said lower section of the cell is further provided with a current distribution grid in electrical association with both the lower portion of said gas diffusion electrodes and an electrode terminus connected to the lower section of the cell.

3. A fuel cell for the generation of electrical energy in which a liquid reactant is brought into contact with electrode means and in which a gaseous reactant is brought into contact with the opposing electrode means which comprises in combination a cell body having a liquid electrolyte bath contained therein, said cell body comprising an upper section and a lower section having a separable middle section therebetween, said middle section comprising an electrically conductive outer casing having positioned therein and in electrical association with said outer casing a plurality of gas diffusion electrodes comprising an outer porous surface and an inner chamber adapted to be fed gaseous reactant, said upper section of the cell having a plurality of electrode means extending downwardly therefrom into said middle section in alternating, spaced relationship to said gas diffusion electrodes, said upper section of the cell being further provided with means for bringing a liquid reactant into contact with the electrode means which extend downwardly therefrom, said lower section being provided with a reservoir for the liquid reactant which is passed downwardly along the electrode means in association with the upper section, said lower section being further provided with outlet means for withdrawing liquid reactant from said reservoir, said upper section of the cell being further provided with an electrode terminus in electrical association with the electrodes in association therewith, and said middle section being further provided with an electrode terminus in electrical association with said gas diffusion electrodes.

4. The cell of claim 3 in which the lower section of the cell is further provided with outlet means for withdrawing liquid electrolyte from the cell above the level of the reservoir for the liquid reactant.

References Cited by the Examiner
UNITED STATES PATENTS

| | | | |
|---|---|---|---|
| 963,852 | 7/1910 | Benko | 136—86 |
| 2,921,110 | 1/1960 | Crowley et al. | 136—86 |
| 3,057,946 | 10/1962 | Eidensohn | 136—86 |

OTHER REFERENCES

Survey of State of The Art, Fuel Cell Development, March 30, 1961, pages 82–84.

WINSTON A. DOUGLAS, *Primary Examiner.*

JOHN R. SPECK, *Examiner.*

H. FEELEY, *Assistant Examiner.*